3 Sheets. Sheet 1.

Plant & Shepard.
Nut Machine.

No. 79,255. Patented June 23, 1868.

Witnesses:
Edwin P. Hotchkiss
Alfred Hotchkiss

Inventor.
Amzi P. Plant
Amos Shepard

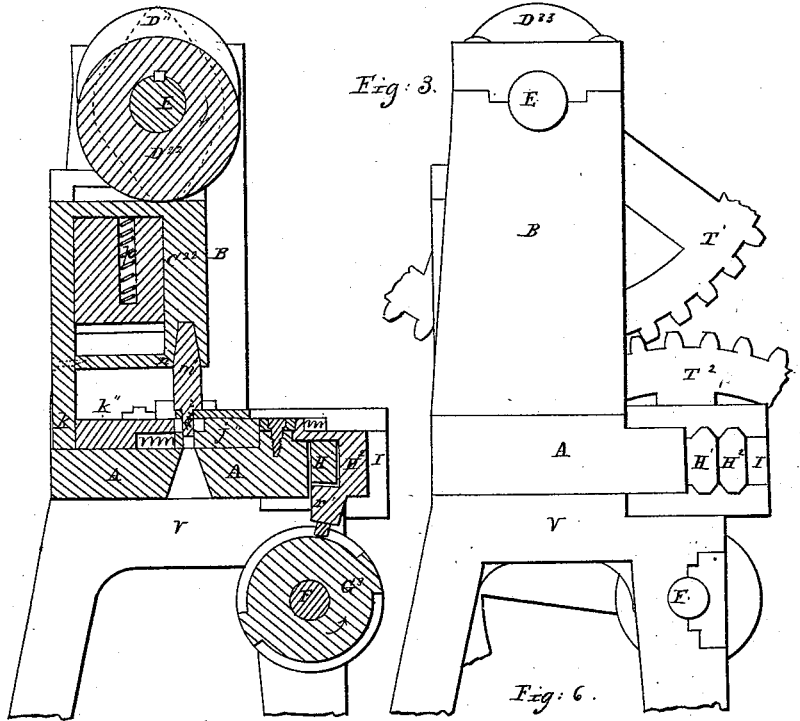
Plant & Shepard,
Nut Machine.
Nº 79,255.　　Patented June 23, 1868.
Witnesses:
Edmund P. Hotchkiss
Alfred Hotchkiss
Inventor:
Amzi P. Plant
Amos Shepard Plant & Shepard,
Nut Machine.

№ 79,255. Patented June 23, 1868.

3 Sheets. Sheet 3.

Witnesses:
Edwin P. Hotchkiss
Alfred Hotchkiss

Inventor
Amzi P. Plant
Amos Shepard

United States Patent Office.

AMZI P. PLANT AND AMOS SHEPARD, OF PLANTSVILLE, CONNECTICUT.

Letters Patent No. 79,255, dated June 23, 1868.

IMPROVED MACHINE FOR FORGING NUTS.

*The Schedule referred to in these Letters Patent and making part of the same.*

TO ALL WHOM IT MAY CONCERN:

Be it known that we, AMZI P. PLANT and AMOS SHEPARD, of Plantsville, in the county of Hartford, State of Connecticut, have invented a new and improved Machine for Forging Nuts; and we do hereby declare that the following is a full, clear, and exact description thereof, which will enable others skilled in the art to make and use same, reference being had to the accompanying drawings, making a part of this specification, in which—

Figure 3 is an end view of the same.

Figure 4 is a transverse vertical section of the same, taken in the line $x\ x$, fig. 1.

Figure 5 is a transverse vertical section of a portion of the same, taken in the line $y\ y$, fig. 1.

Figure 6 is a portion of the same, as viewed from underneath, with a small part broken away, to show the arrangement of parts.

Similar letters of reference indicate corresponding parts in the several figures.

Our invention consists in a novel and improved manner of feeding or conveying the nut-blank from the cut-off mechanism to the dies, for bazzeling its corners, punching its hole, and swaging its edges, whereby we are enabled to make the mechanism for feeding or conveying the nuts much lighter and less cumbersome than hitherto; and, also, to make a double machine, with one cut-off, (the blanks, as they are cut off, being conveyed, one to the right, and one to the left, in alternate succession,) of great simplicity, and with but little multiplication of parts; and, also, in the peculiar construction of the dies, their construction being such as to form the angles of the nut more acute and perfect than by the dies most commonly used.

To enable those skilled in the art to fully understand and construct our invention, we will proceed to describe it.

A represents a horizontal bed, supported by the supports V V. B is a stand, attached to the bed A, composed of two uprights and a horizontal cross-bar, extending from one to the other, and connecting them. This cross-bar has vertical slides, $C^{33}\ C^{22}\ C^{11}\ C\ C^1\ C^2\ C^3$, fitting in grooves in the front of it. Above and parallel with the cross-bar, and fitting in journals in the upper part of the uprights of the stand B, is the driving-shaft E, having the cams $D^{33}\ D^{22}\ D^{11}\ D\ D^1\ D^2\ D^3$ rigidly secured to it. These cams are placed in such positions as to coincide with the aforementioned slides.

Figure 7:
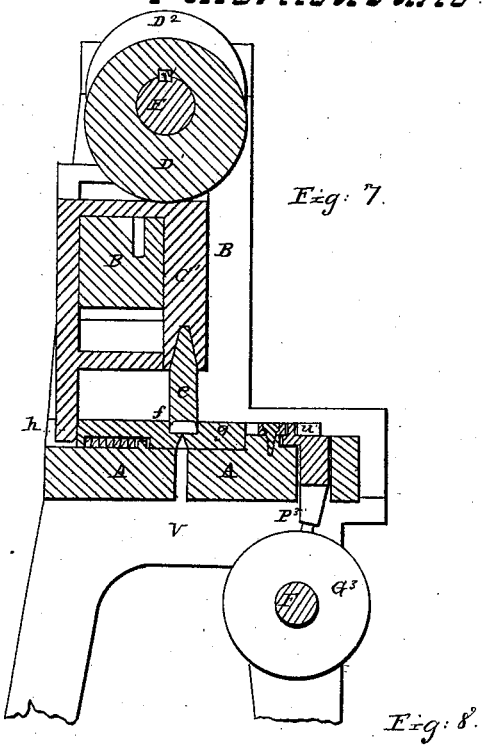
Figure 7 is a transverse vertical section of a portion of the same, taken in the line $z\ z$, fig. 1.

The cam $D^1$ and sliding bar $C^1$, with the wedge $h^1$ attached to it, the die $e'$, for bazzeling the corners of the nut, and the horizontal sliding die $f$ and stationary die $g$, for swaging the edges of the nut, as shown plainly in fig. 7, constitute the mechanism which first forges the blank after it has been cut from the bar. The cam $D^{11}$, sliding bar $C^{11}$, wedge $h^{11}$, dies $e''\ f''\ g''$, are the exact counterparts or duplicates of the above-mentioned mechanism. The punching and the finishing-mechanism, hereinafter described, are also duplicated, as plainly seen by reference to the drawings.

Figure 1:
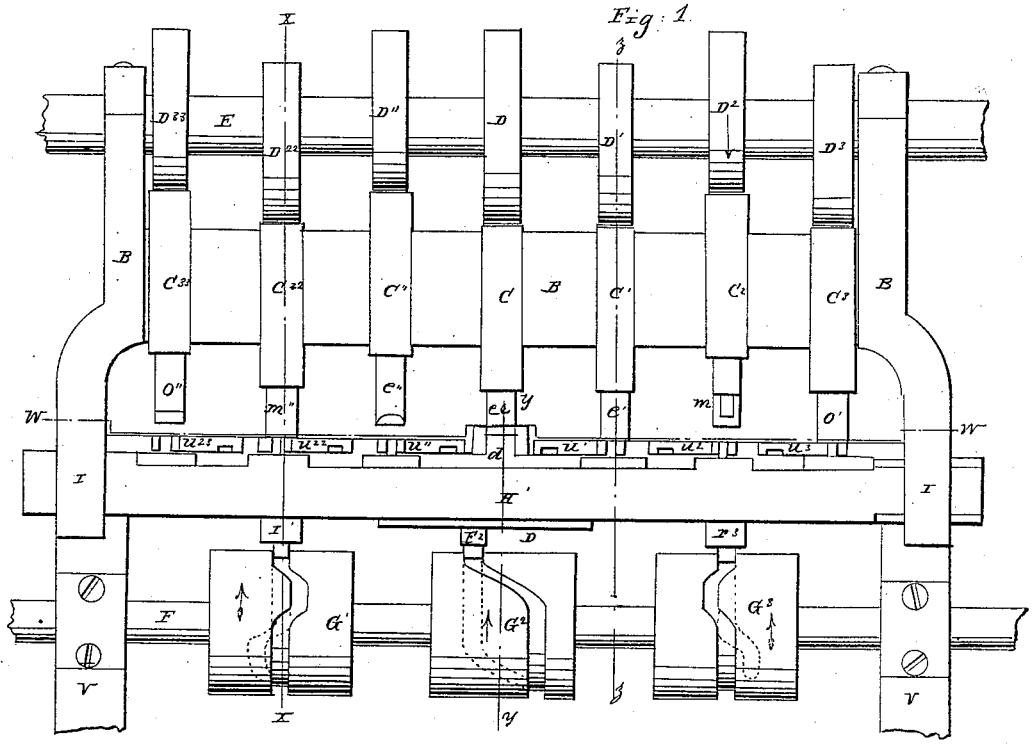
Figure 1 is a front view of our invention.
Figure 2:
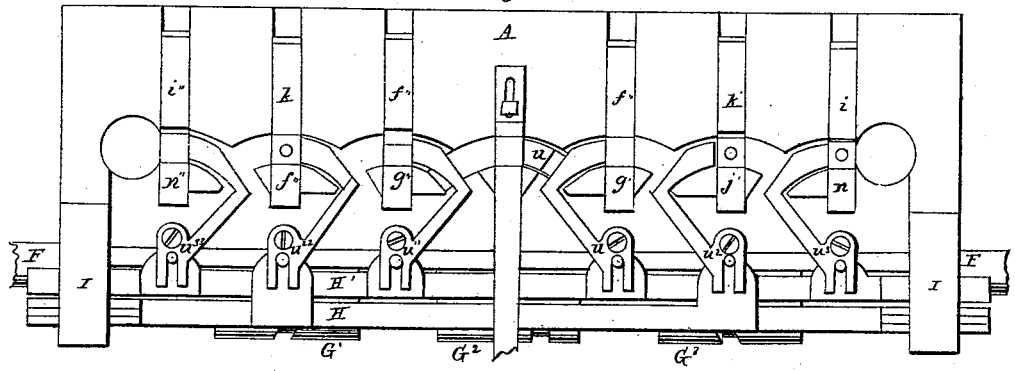
Figure 2 is a horizontal section of the same, taken in the line $w\ w$, fig. 1.

The cam $D^{22}$ and the sliding bar $C^{22}$, with the wedge $h^{22}$ attached to it, the punch $m''$, for punching the hole in the nut, and the horizontal sliding die $k''$ and stationary die $j''$, with the hole through which the punchings are pushed in it, as shown in fig. 4, constitute the mechanism for punching the hole in the nut. The cam $D^{33}$ and sliding bar $C^{33}$, with its wedge similar to the ones upon the sliding bars $C^{22}\ C^{11}$, the die $o^{11}$, for flattening the top of the nut after it has been punched, the horizontal sliding die $i''$, and stationary die $n''$, for swaging the edges of the nut, constitute the mechanism for finishing the nut. The cam D and sliding bar C, with the cutting-off dies $c$ and $d$, form the "cut-off" mechanism. This, in a double machine, with its right and left-hand parts symmetrically arranged, as in our invention, should be placed midway between the right and left-hand ends of the machine. The cam D has two projections, as shown by the dotted lines, fig. 4. These projections, as the shaft E (on which the cam D is secured) is caused to revolve, act upon the sliding bar C, causing it to descend twice during one revolution of the cam D. The sliding bar C is moved upward or retracted by the reaction of a spring similar to the spring $p$, fig. 4. The cams $D^{33}$ $D^{22}$ $D^{11}$ $D^1$ $D^2$ $D^3$ of the mechanism, for bazzeling the corners, punching the hole, and finishing the nut, have but one projection, as shown in the drawings. These cams, as they revolve, act upon their coinciding sliding bars $C^{33}$ $C^{22}$ $C^{11}$ $C^1$ $C^2$ $C^3$, causing them to descend, and the sliding bars $C^{33}$, &c., are retracted by springs. The wedges upon the slides $C^{33}$ $C^{22}$ $C^{11}$ $C^1$ $C^2$ $C^3$, as they descend, act upon inclined planes on the sliding dies $i''$ $k''$ $f''$ $f'$ $k'$ $i'$, shown in part in figs. 4 and 7, causing the horizontal sliding dies to move towards the stationary dies, $n''$ $j''$ $g''$ $g'$ $j'$ $n'$, opposite. The sliding dies $i''$ $k''$ $f''$ $f'$ $k'$ $i'$ are retracted by springs, one of which is shown in fig. 4. Underneath and parallel with the front edge of the bed A, and fitting in journals in the supports V V, is a horizontal shaft, F, having the cams $G^1$ $G^2$ $G^3$ secured to it. In front of the bed A, and parallel with the shaft F, are two slides, $H^1$ $H^2$, placed in the guides I I. These guides are secured to the bed A. Underneath the bed A there is also a slide, J, shown in figs. 1, 5, and 6.

The slides $H^1$, $H^2$, and J, have pendants, $r^1$ $r^2$ $r^3$, secured to them; and these slides are actuated by the grooved cams $G^1$ $G^2$ $G^3$ as they revolve, striking against these pendants. On the upper surface of the bed A are the conveyers $u^{33}$ $u^{22}$ $u^{11}$ $u^1$ $u^2$ $u^3$; and underneath the bed A is another conveyer, $u$. These conveyers swing horizontally, to the right and left, upon fulcrum-pins, and are actuated by pins or cogs (gearing in slots made in arms of the conveyers) upon the slides $H^1$, $H^2$, and J, as these slides are moved by the cams $G^1$ $G^2$ $G^3$. The conveyer $u$ has a projection, which extends upward through a hole in the bed A, and underneath the cut-off mechanism.

The shafts E F are made to revolve with equal velocities, by means of any proper gearing connecting them, and the first motor may be applied either to the shaft E or F.

A nut is forged by our invention in the following manner: The heated bar is fed underneath the cut-off die $c$, the machine having been previously set in motion. The die descends by the action of the cam D, and severs a blank from the bar. At this moment the cam G moves the slide J, by acting against the pendant $r^2$ of this slide, and a pin or cog upon this slide, gearing into a slot made in one arm of the conveyer $u$, swings the opposite arm of conveyer $u$ either to the left, to the position shown in fig. 8, or right, according to the position of the cam G.

Figure 8:
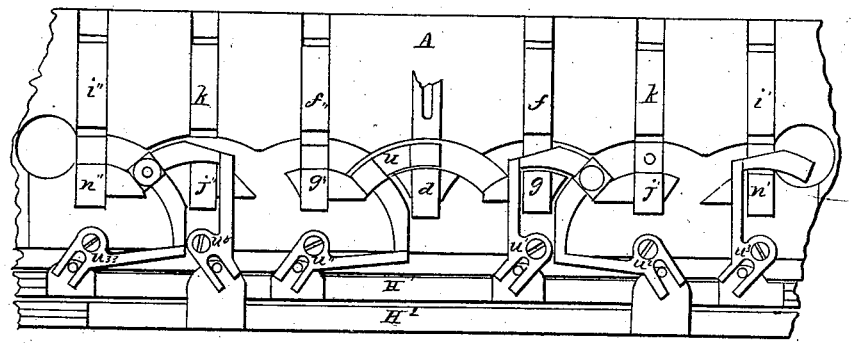
Figure 8 is a horizontal section of a portion of the same, similar to fig. 2, showing a position of the conveyers while exchanging the nuts.

The conveyer $u$ is placed underneath the cut-off; and the arrangement is such that a blank, when cut from the bar, is deposited upon either the right or left-hand end of it. The conveyer $u$ carries the blank from the cut-off, in a curved direction, nearly one-eighth of a circle, and midway between the cut-off and first-forging mechanism, and placing it, relatively to the dies, in a diagonal position, as shown in fig. 8, and in front of the end of the curved arm of conveyer $u^{11}$ or $u^1$. As soon as the blank has been placed in this position, the cam $G^3$ acts against the pendant $r^3$ of the slide $H^1$, imparting motion to this slide. The pin or cog which gears into the slot in the arm of conveyer $u^{11}$ or $u^1$ upon this slide swings the opposite arm of the conveyer, pushing the nut-blank before it to the dies of the first-forging mechanism. The die for bazzeling the corners of the nut now descends upon it, by the action of the cam $D^{11}$ or $D^1$ upon the slide $C^{11}$ or $C^1$, and, during the descent of this slide, the wedge attached to it acts upon the inclined plane of the horizontal sliding die $f''$ or $f'$, moving this die towards the stationary die $g''$ or $g'$, swaging the nut-blank upon two of its edges. As soon as these operations are performed, and the dies are retracted by the action of their respective springs, the slide is again moved in the same manner as before, again swinging conveyer $u^{11}$ or $u^1$, pushing the nut-blank from the dies, and conveying it midway between the punching-dies and dies of the first-forging mechanism, and in front of the end of the curved arm of conveyer $u^{22}$ or $u^2$. The slide $H^2$ is now moved by the cam $G^1$, acting against the pendant $r^1$ of this slide, and the pin or cog on this slide, gearing into the conveyer $u^{22}$ or $u^2$, swings its curved arm, pushing the nut under the punch of the punching-mechanism. The punch now descends, by the action of the cam $D^{22}$ or $D^2$, upon the slide $C^{22}$ or $C^2$, and punches the hole in the nut. The position of the punching-mechanism, at this stage of the operation, is clearly shown by fig. 4. As soon as the punch is withdrawn from the nut, the conveyer $u^{22}$ or $u^1$ is again actuated by its respective mechanism, pushing the nut from the punching-dies, conveying it midway between the finishing and punching-mechanism, and in front of the end of the curved arm of conveyer $u^{33}$ or $u^3$, as shown clearly in fig. 8. The conveyer $u^{33}$ or $u^3$ is now moved by the action of the cam $G^3$ upon the pendant $r^3$ of the slide $H^2$, pushing the nut to the finishing-mechanism. This finishing-mechanism is similar in its operation to the first-forging mechanism. The finishing-operation is next performed, and, when completed, the conveyer $u^{33}$ or $u^3$ is again moved, pushing the finished nut from the finishing-dies, when it drops out through a hole in the bed A, shown in figs. 1 and 8.

The cut-off first deposits a nut-blank on the left-hand end of conveyer $u$, (when it is in position shown in fig. 1,) and the conveyer then carries the nut-blank to the left, to the position shown in fig. 8. The cut-off then deposits a nut on the right-hand end of conveyer $u$, which, as the conveyer $u$ is moved back to its former position, carries a nut-blank to the right. Thus, it will be seen that the conveyer $u$ always carries a nut-blank, whether moving to the right or left. We would also state, that the action of the conveyers may be fully understood, that the conveyers $u^{33}$ $u^{11}$ move backward, to receive a nut-blank, at the same time that the conveyers $u^1$ $u^3$ move forward, conveying the nut-blank; and that the conveyer $u^{22}$ moves backward at the same time that the conveyer $u^2$ moves forward, and vice versa. We would here remark that the punching-mechanism on the right, the cut-off in the central, and the first-forging and finishing-mechanism on the left part of the machine, operate simultaneously; and that the punching-mechanism on the left, the cut-off in the central, and the first-forging and finishing-mechanism on the right, operate simultaneously, so that there are four nut-blanks operated upon at one time.

The dies (for forging the edges of the nut) of our invention constitute an important feature. The swaging-dies of nut-machines, as heretofore constructed, are composed of three separate pieces, at least, the edges of the nut being swaged by two or four surfaces, which are perpendicular to the surface upon which the nut rests. The surface upon which the nut rests is on a piece either wholly disconnected from the perpendicular surfaces, or secured or connected with but one. Swaging-dies constructed in this manner have their edges soon worn by the scales and rough edges of the nut, protruding underneath and between the surface on which the nut rests and the adjoining edges of the perpendicular surfaces, and, consequently, fail to swage the edges of the nut as acute and perfect as desired. The dies have one-half of the surface upon which the nut rests, and the perpendicular surface, for swaging one edge of the nut, solid, in one piece, as shown by the illustration of the dies $f'$ $g'$, fig. 7.

It will be readily seen by the skilled mechanic that a machine having but one set of mechanism for swaging, punching, and finishing, can be constructed with conveyers to operate in the same, or nearly the same, manner as the right and left-hand conveyers described in these specifications, and we would not limit ourselves to the manner and arrangement of the right and left conveyers, as arranged in a "right and left-hand machine" alone, but we consider it as of our invention when applied to a machine having but one set of swaging, punching, and finishing-mechanism.

We are aware that nut-forging machines have been constructed having mechanism for conveying the nuts from one part to another, and we do not claim these devices irrespective of their arrangement and mode of operation.

Having thus described our invention, what we claim as new, and desire to secure by Letters Patent, is—

1. The right and left-hand conveyer $u$, when so constructed as to convey a nut-blank from the cut-off mechanism, whether moving from the right or left, and slotted plate A, in combination with the cut-off device, and a forging-mechanism on the right and left of it, substantially as described.

2. The swinging conveyers $u^1$ $u^2$ $u^3$, in combination with the forging, punching, and finishing-mechanism, all constructed, arranged, and operating substantially as described.

AMZI P. PLANT,
AMOS SHEPARD.

Witnesses:
E. H. PLANT,
E. P. HOTCHKISS.